United States Patent [19]
Johnsen

[11] 4,086,047
[45] Apr. 25, 1978

[54] TREAD RING DISASSEMBLY AND REASSEMBLY APPARATUS

[75] Inventor: John Arthur Johnsen, Copley, Ohio

[73] Assignee: The Firestone Tire & Rubber Company, Akron, Ohio

[21] Appl. No.: 798,412

[22] Filed: May 19, 1977

[51] Int. Cl.² .................. B29H 5/08; B29H 17/00; B29H 3/08; B29F 1/00
[52] U.S. Cl. .................. 425/450.1; 425/46; 425/47; 425/542; 425/556; 425/577; 425/589
[58] Field of Search ............... 425/17, 23, 21, 28 R, 425/35, 43, 46, 47, 542, 450.1

[56] References Cited

U.S. PATENT DOCUMENTS

| | | | |
|---|---|---|---|
| 3,067,457 | 12/1962 | Dennis et al. | 425/17 X |
| 3,240,653 | 3/1966 | Mattox et al. | 425/23 |
| 3,418,400 | 12/1968 | Clapp | 425/23 X |
| 3,730,658 | 5/1973 | Marra | 425/47 |
| 3,741,696 | 6/1973 | Greenwood | 425/47 |
| 3,782,871 | 1/1974 | Turk | 425/35 X |
| 3,837,986 | 9/1974 | Gorter et al. | 425/28 R X |
| 3,850,555 | 11/1974 | Pasch | 425/47 X |
| 3,852,006 | 12/1974 | Irie | 425/47 |
| 3,854,853 | 12/1974 | Mirtain | 425/47 |
| 3,868,203 | 2/1975 | Turk | 425/46 X |
| 3,924,982 | 12/1975 | Yang et al. | 425/35 |
| 3,999,907 | 12/1976 | Pappas | 425/47 X |
| 4,043,725 | 8/1977 | Schmidt | 425/542 |

FOREIGN PATENT DOCUMENTS

| | | | |
|---|---|---|---|
| 1,440,604 | 4/1966 | France | 425/43 |

*Primary Examiner*—J. Howard Flint, Jr.

[57] ABSTRACT

The present disclosure relates to an apparatus for automatically disassembling a tread ring from a centrifugally cast vehicle tire and then reassembling the tread ring after the tire has been removed.

4 Claims, 8 Drawing Figures

TREAD RING DISASSEMBLY AND REASSEMBLY APPARATUS

The present disclosure teaches an apparatus for removing the tread ring portion of a mold from a centrifugally cast vehicle tire. The tread ring portion of the mold usually carries the tread design and is normally comprised of at least two semi-circular segments which are held in place during the molding operation by a retaining ring. The tread ring may comprise up to as many as eight segments; however, the tread ring illustrated in the present disclosure is comprised of two segments.

The prior art method of removing the tread ring segments from a centrifugally cast tire consisted of screwing an eyebolt or other attaching means into the tread ring segments and then pulling the segments off of the finished tire with a chain hoist while the tire assembly was held in place by a shaft extending through a hub which was located interiorally of the tire. The tread ring segments have also been separated by prying their connected ends apart by means of a screwdriver and using hammers to disassemble the segments.

The present disclosure teaches automating the disassembly process and makes the disassembly much safer since the heavy mold parts are not directly handled by workmen. After the tread ring segments have been disassembled from the finished tire, another advantage of the apparatus is in its ability to reassemble the tread ring and hold it in a position so the retaining ring can be once again attached.

In general the apparatus of the present invention comprises a plurality of jaw units mounted on a frame and at a given vertical level and in what may be referred to as a circular arrangement. In the present disclosue there have only been illustrated two jaw units because the tread ring illustrated herein is comprised of only two segments. In those instances where a greater number of segments are utilized, for example eight in number, there would be eight jaw units, one for use with each segment. Each jaw unit is designed so as to travel from a radially inward position to a radially outward position. In operation the completely molded tire containing the core segments therein and with the tread ring in place around the outer periphery of the tire, is lowered into position in the plane of the jaw units. Each jaw unit is actuated to grip its related tread ring segment and is moved outwardly by motive power means thereby pulling a tread ring segment from the tread of the completed tire. After the tread ring segments have been removed from the periphery of the tire, the tire containing the core segments is moved out of the plane of the jaw units and any surfaces of the tread ring segments can be cleaned free of any rubber flash or the like. The jaw units are then moved inwardly to reassemble the tread ring segments and a retaining ring is moved into position around the tread ring segments and is secured in position so as to once again render the tread ring operable for another centrifugal casting operation.

Other objects and a fuller understanding of this invention may be had by referring to the following description and claims, taken in cnjunction with the accompanying drawings, in which:

Figure 1:
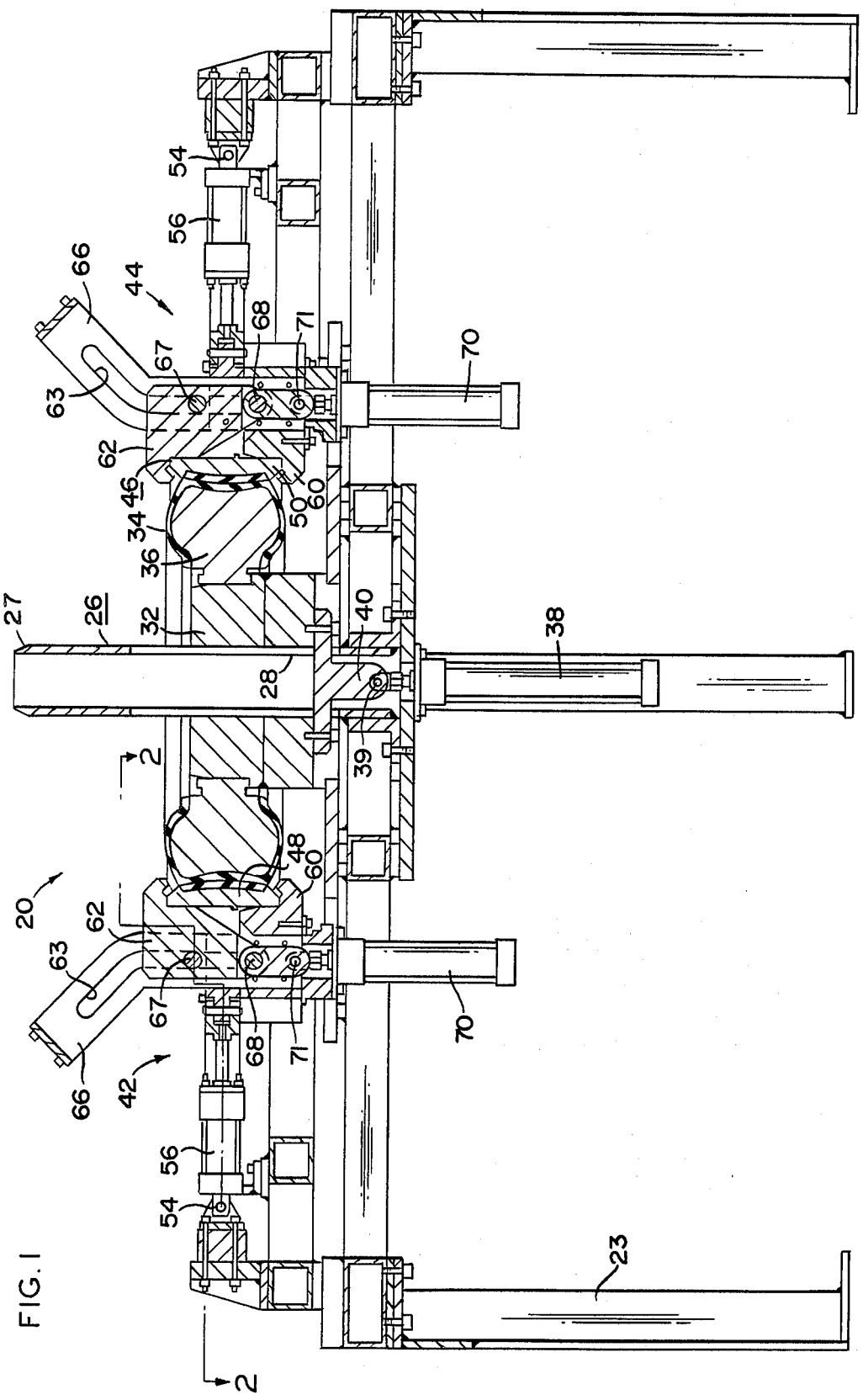
FIG. 1 is an elevational view, partially in section, of the apparatus of the present invention.

The tread ring disassembly and reassembly apparatus of the present invention is indicated generally by the reference numeral 20 and includes a frame 23 constructed of angle iron and rectangularly shaped tubing as illustrated in the drawings. The apparatus includes a vertically extending guide member 26 fixedly secured to the frame and the guide member 26 has an upper portion 27 and lower end portion 28.

A support member 32 is movable between upper and lower positions and is guided in its movement by the guide member 26. The support member 32 is of such a configuration that it is capable of receiving on its periphery, assembled core segments 36 which are contained within the confines of a centrifugally cast vehicle tire 34. The construction of the support member 32 is well illustrated in FIG. 1 of the drawings. A hydraulic cylinder 38 is secured to the frame 23 immediately below the support member 32 and the piston portion of the cylinder is pivotally connected at 39 to a yoke 40 which in turn is connected to the support member. Actuation of the cylinder 38 causes the support member 32 to move between its lower position shown in FIG. 1 and its upper position shown in FIG. 4. The yoke 40 travels in a slot in the guide member 26.

Figure 4:
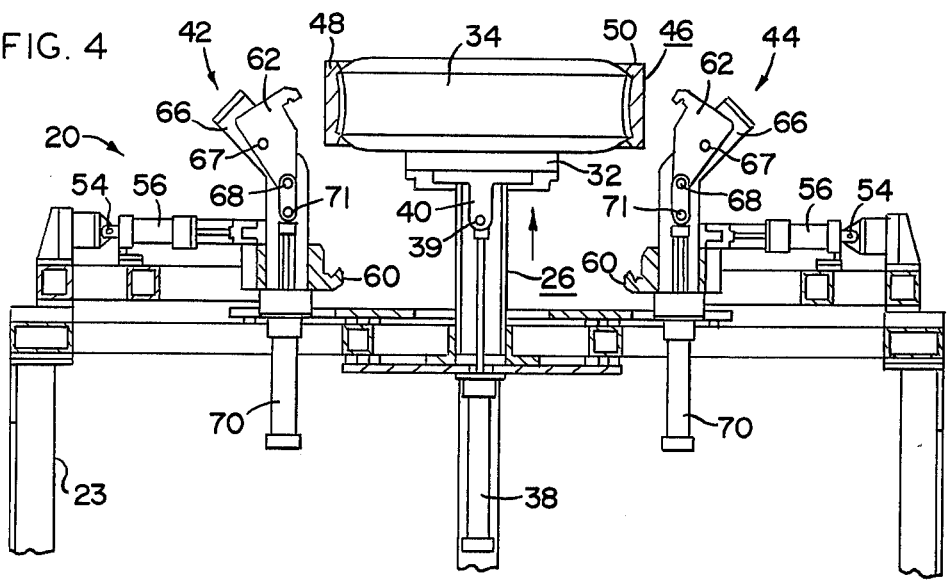
FIGS. 4, 5 and 6 are views similar to FIG. 1; however, illustrating the operational sequence of the apparatus as described in the specification.
Figure 5:
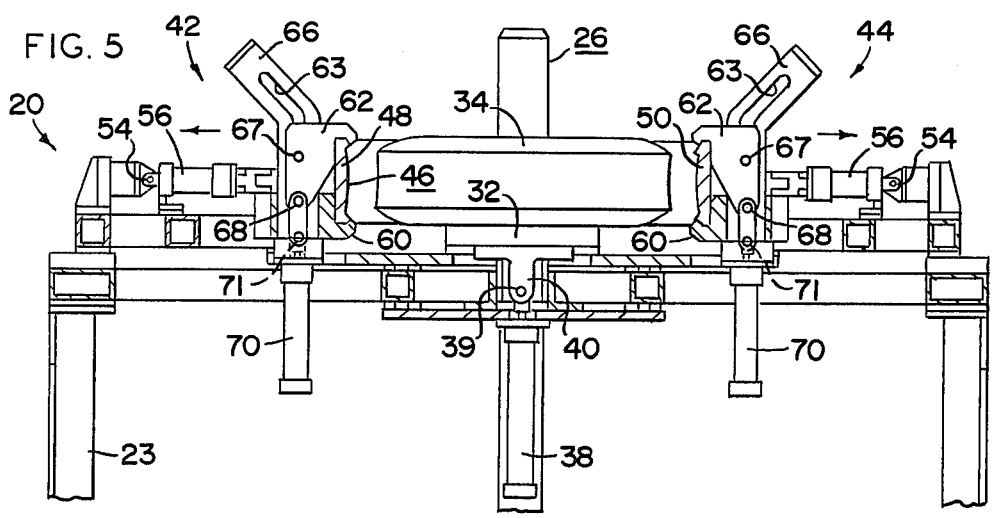
Figure 6:
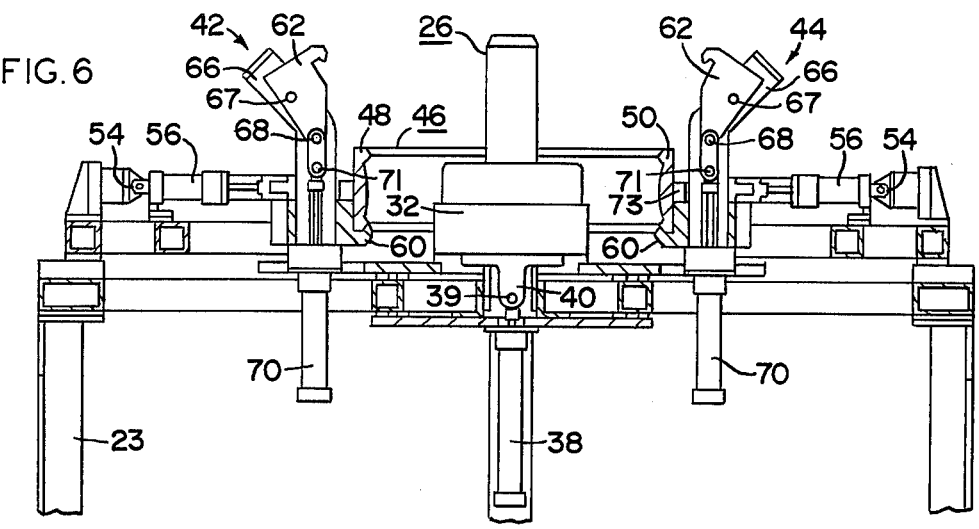

First and second jaw assemblies 42 and 44 are carried by the frame 23 and are movable between open and closed positions. The closed position of the jaw assemblies is shown in FIGS. 1 and 5 and the open position of the jaw assemblies is illustrated in FIGS. 4 and 6. The jaw assemblies 42 and 44 are located a spaced distance from each other equal to the diameter of a tread ring 46 which is to be disassembled and reassembled by the apparatus and the jaw assemblies are so mounted by the frame that they are capable of moving radially outwardly in a horizontal direction from the position shown in FIG. 1 to a position illustrated, for example, in FIG. 5, where the jaw assemblies are spaced a greater distance apart. The purpose of this movement will be described in more detail hereinafter; however, as illustrated in the drawings, it is to separate the tread ring segments from the centrifugally cast vehicle tire. The tread ring 46 as illustrated in the drawings is comprised of two segments indicated by the reference numerals 48 and 50 respectively.

Figure 2:
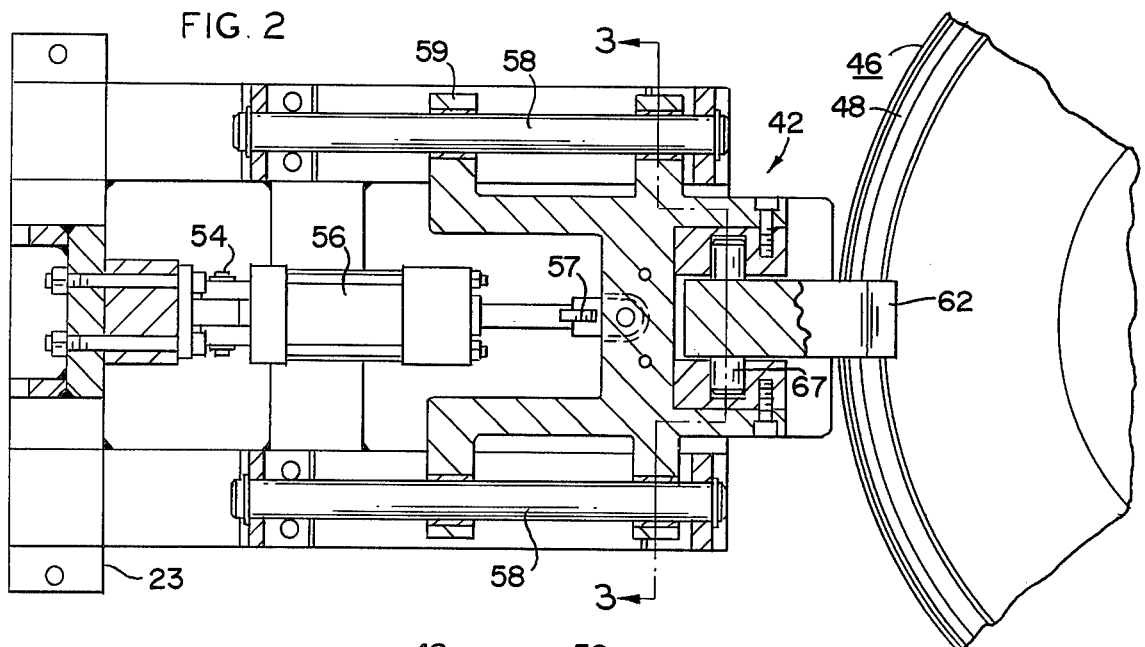
FIG. 2 is a view taken generally along the line 2—2 of FIG. 1.
Figure 2B:
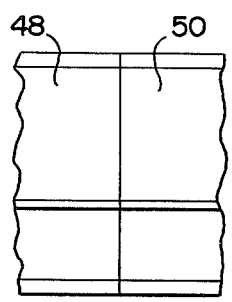
FIG. 2B is a view taken generally along the line 2B—2B of FIG. 2A.
Figure 3:
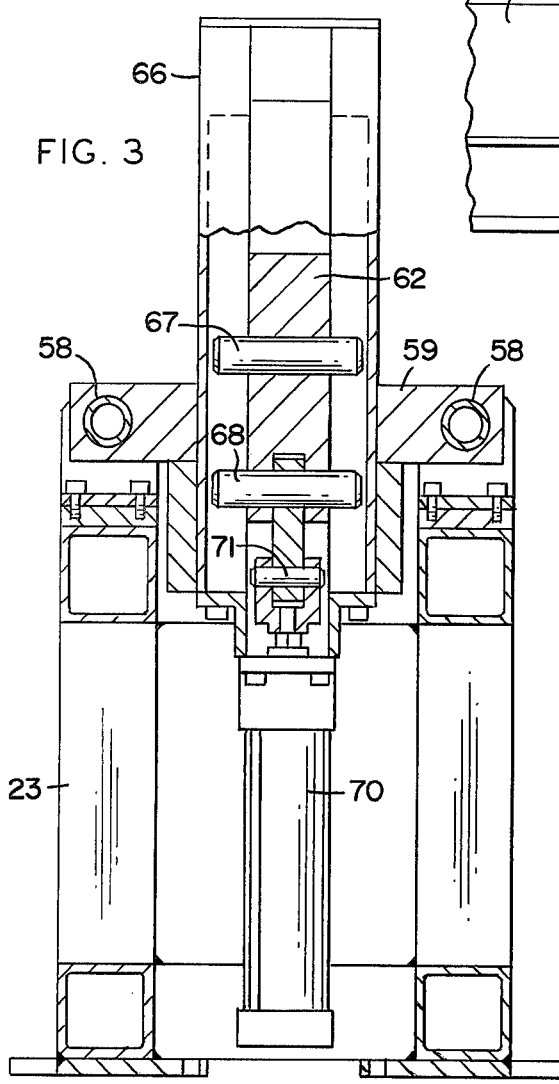
FIG. 3 is a view taken generally along the line 3—3 of FIG. 2.
Figure 2A:
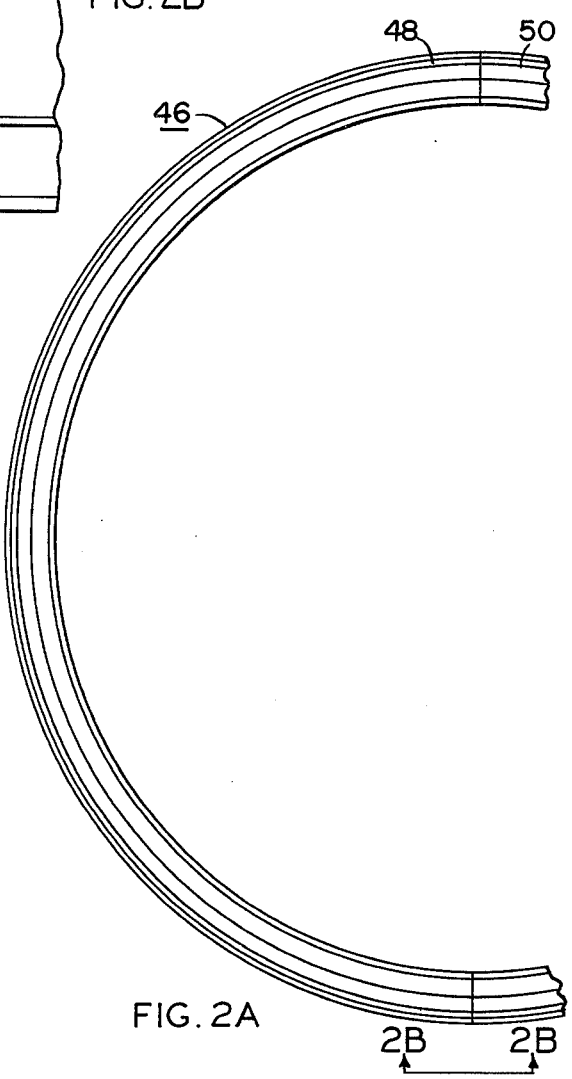
FIG. 2A is a view taken in the same direction as FIG. 2 and showing the abutment of the ends of the two tread ring segments.

A hydraulic cylinder 56 is utilized in conjunction with each of the jaw assemblies 42 and 44 for the purpose of moving the jaw assemblies between the aforementioned inward and outward positions. The cylinders 56 are secured to the frame 23 by a pivot 54 and are attached by means of the piston portion thereof at 57 to the jaw assemblies for moving the same. Guide rods 58, best seen in FIGS. 2 and 3 of the drawings, provide guiding means for the back and forth movement of the jaw assemblies 42 and 44. It will be seen in FIGS. 2 and 3 that a carriage 59 which forms part of the jaw assemblies has a portion which surrounds the guide rods 58.

Each of the first and second jaw assemblies 42 and 44 is provided with a lower jaw 60 which is fixedly secured to its respective assembly which includes the carriage 59. Jaw guide means 66 are located adjacent the upper jaw 62 of each of the jaw assemblies and includes a guideway 63 within which are received pins 67 and 68 which in turn are connected to the upper jaw 62. The ends of the pins 67 and 68 reside in the guideway 63 of guide means 66 which guides the upper jaw in its movement relative to the lower jaw. It will be seen, particularly from FIG. 1, that the guide means 66 serve to guide the upper jaw when it is moved both upwardly and laterally outwardly away from the guide member 26. The position of the upper jaws in their uppermost location is illustrated in FIGS. 4 and 6. A hydraulic cylinder 70 is secured to each of the upper jaws at 71 and when actuated causes the upper jaw to move upwardly from the position of FIG. 1 to the position of FIG. 4 and when actuated in the opposite direction causes the upper jaw to move from the position of FIG. 4 back to the position of FIG. 1.

In the operation of the apparatus 20, the support member 32 is moved to its uppermost position as shown in FIG. 4 by actuation of the hydraulic cylinder 38 and the upper jaws 62 are moved to their uppermost position by means of the hydraulic cylinders 70. The jaw assemblies 42 and 44 are maintained in their innermost radial position by means of the cylinders 56. The support member 32 in its uppermost position receives the tire 34 with the core segments 36 contained therein and with the tread ring 46 around the periphery of the tire. The tire, core segments and tread ring assembly are then lowered to the position shown in FIG. 1 and the upper jaws are moved from their uppermost position downwardly to the position shown in FIG. 1 so that the jaw assemblies 42 and 44 are firmly attached to the respective segments 48 and 50. The cylinders 56 are next actuated to move the jaw assemblies 42 and 44 outwardly from the position shown in FIG. 1 to the position shown in FIG. 5 which separates the segments 48 and 50 from each other and from the periphery of the tire 34. The support member 32 is then raised to the position shown in FIG. ∝ (minus the separated tread ring segments 48 and 50) and a lifting device is attached to the tire with its core segments contained therein and they are removed. The support member 32 is then lowered to the position shown in FIGS. 1 and 5. In the next step the cylinders 56 are actuated so as to bring the segments 48 and 50 back into engagement with each other to form a full circle. The cylinders 70 are next actuated to move the upper jaws 62 to their uppermost position as shown in FIG. 6 and a retaining ring 73 is placed around the repositioned tread ring segments 48 and 50 to hold the segments in position. The retaining ring 73 is tightened in a conventional manner and a lifting device is utilized to remove the reassembled tread ring from the apparatus.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A tread ring disassembly and reassembly apparatus including in combination a frame, a vertically extending guide member mounted on said frame and having upper and lower end portions, a support member movable between upper and lower positions and being guided in said movement by said guide member, first motive power means operable connected to said support member for moving same between said upper and lower positions, first and second jaw assemblies mounted by said frame and being movable between open and closed positions, said first and second jaw assemblies in a first position being spaced from each other a distance on the order of the diameter of a tread ring to be disassembled and reassembled, said first and second jaw assemblies being mounted for back and forth movement in a horizontal direction between said first position and a second position where said first and second jaw assemblies are spaced a greater distance apart, second motive power means for moving said first and second jaw assemblies back and forth between said first and second positions, each of said first and second jaw assemblies having a lower jaw and an upper jaw, each said lower jaw being fixedly secured to its respective assembly, jaw guide means adjacent each of said upper jaws and cooperating with said upper jaws to guide same through vertical and lateral movement with respect to a corresponding lower jaw and between upper and lower positions, and third motive power means connected to said upper jaws for moving the same between their said upper and lower positions.

2. A tread ring disassembly apparatus for disassembling a tread ring which comprises a plurality of segments including in combination a vertically extending guide member having upper and lower end portions, a support member movable between upper and lower positions and being guided in said movement by said guide member, first motive power means operably connected to said support member for moving same between said upper and lower positions, first and second jaw assemblies each comprising first and second jaws which first and second jaws are movable between open and closed positions, said first and second jaw assemblies in a first position being spaced from each other a distance on the order of the diameter of the tread ring to be disassembled, means for moving said jaws of each assembly between said open and closed positions whereby said jaws in said closed position thereof may engage and hold a segment of the tread ring, said first and second jaw assemblies being mounted for back and forth movement in a horizontal direction between said first position and a second position where said first and second jaw assemblies are spaced a greater distance apart, second motive power means for moving said first and second jaw assemblies back and forth between said first and second positions whereby with said jaws of each jaw assembly holding a segment of the tread ring, the segments are moved back and forth toward and away from each other.

3. Tread ring disassembly apparatus as claimed in claim 2 wherein said first jaw of each of said first and second jaw assemblies is fixed and said second jaw of each of said first and second jaw assemblies is movable toward and away from said first jaw, guide means cooperating with said second jaw of each of said first and second jaw assemblies for guiding same in its movement relative to said first jaw, and means for moving said second jaw of each of said first and second jaw assemblies in its movement relative to said first jaw.

4. A tread ring disassembly apparatus including in combination means for holding a tire which has a tread ring extending circumferentially around the external periphery of the tire and which tread ring comprises a plurality of segments each having ends which engage each other, a plurality of jaw assemblies corresponding in number to the number of segments in the tread ring, each jaw assembly having a first fixed jaw member and a second movable jaw member movable between open and closed positions to hold one of the previously recited tread ring segments, means for moving said second movable jaw member between said open and closed positions, guide means cooperating with said second movable jaw member to guide same through its movement relative to said first fixed jaw member, said guide means comprising a cam slot engageable by a portion of said second movable jaw member to guide said second movable jaw member both longitudinally and latterly with respect to said first fixed jaw member, and means for moving each of said jaw assemblies outwardly in a generally radial direction with respect to the tire to separate the segments of the tread ring from each other and for moving each of said jaw assemblies inwardly in said generally radial direction to bring the segments of the tread ring back together.

* * * * *